United States Patent [19]

Iizuna et al.

[11] Patent Number: 5,230,715
[45] Date of Patent: Jul. 27, 1993

[54] PYROGEN AND CANISTER INCORPORATING PYROGEN

[75] Inventors: Yasuyuki Iizuna, Okayama; Shinya Takada, both of Okayama, Japan

[73] Assignees: Dowa Iron Powder Co., Ltd.; Iwatani International Corp., both of Japan

[21] Appl. No.: 789,589

[22] Filed: Nov. 8, 1991

[30] Foreign Application Priority Data

Nov. 10, 1990 [JP]  Japan .................................. 2-304572
Mar. 8, 1991 [JP]  Japan .................................. 3-68931

[51] Int. Cl.$^5$ ............................................... C10L 5/00
[52] U.S. Cl. ....................................... 44/504; 44/250; 44/550; 148/307
[58] Field of Search .................. 44/250, 550, 504, 902

[56] References Cited

U.S. PATENT DOCUMENTS

| | | | |
|---|---|---|---|
| 3,867,155 | 2/1975 | Davis et al. | 106/38.27 |
| 4,013,061 | 3/1977 | Trumble et al. | 44/250 |
| 4,047,942 | 9/1977 | Clark et al. | 75/613 |
| 4,949,702 | 8/1990 | Suzuki et al. | 126/263 |
| 5,096,413 | 3/1992 | Suzuki et al. | 431/267 |

FOREIGN PATENT DOCUMENTS

0363494  4/1990  European Pat. Off. .
0384748A1  8/1990  European Pat. Off. .

OTHER PUBLICATIONS

Kirk–Othmer Encyclopedia of Chemical Technology, vol. 13, pp. 740, 764, 775 (1981).
European Search Report dated Feb. 27, 1992 on Appln. No. EP 91 11 9079.

*Primary Examiner*—Prince Willis, Jr.
*Assistant Examiner*—Alan D. Diamond
*Attorney, Agent, or Firm*—Thompson, Hine and Flory

[57] ABSTRACT

The pyrogen of the invention is formed by the compression of ferrosilicon powder and a mixture of ferric oxide powder and another lower order iron oxide powder. This pyrogen overcomes the weaknesses inherent in earlier pyrogens by dispensing with the use of peroxides. The scope of the invention also extends to the canister which holds the pyrogen. The pyrogen, which is positioned inside the canister's combustion chamber in such a way that it comes into contact with the top of said combustion chamber, is supported by a special ceramic thermal insulator which contains an ignition device comprising an ignition agent, which also incorporates an instant high temperature generating ignition material, and a match head chemical which projects out of a hole in the base cover of the canister. The bottom of the canister is covered by a bottom cap which can be freely removed or replaced as required. The canister, which enables the heating or cooking of whatever is placed inside it, is compact, safe and cheap.

11 Claims, 3 Drawing Sheets

PYROGEN AND CANISTER INCORPORATING PYROGEN

BACKGROUND OF THE INVENTION

1. Field of the Invention

The invention relates to a pyrogen, which depends for its heating effect on a metal redox reaction, and a self-heating canister which incorporates said pyrogen and which is used either to cook or simply to heat up various foodstuffs such as grains, noodles and beverages.

2. Description of the Prior Art

A substantial number of proposals have already been made in respect of pyrogens which make use of the exothermic oxidation of metals (for example: Japanese patent publication gazette S27-582, Japanese utility model laying open gazette S58-24119, and Japanese patent laying open gazette S62-17287, S63-51491, and H1-284582). All these proposals have involved the admixture of metal oxides and peroxides to one or more of the powders of iron, aluminum and ferrosilicon.

When a pyrogen which makes use of peroxides in this way burns, however, the peroxides not only react with the Si but also break down through a process of pyrolysis. This results in the freeing of oxygen gas which in turn facilitates the generation of sparks and flames which are sometimes emitted from the container thereby creating an obvious hazard. Another drawback with this type of pyrogen derives from a tendency to swell rapidly following combustion and to assume a sort of spongelike form under the influence of the aforementioned free oxygen gas.

Japanese patent laying open gazette H1-288218, on the other hand, disclosed the use of a pyrogen composed of ferrosilicon powder plus one or both of the substances $Fe_2O_3$ and $CuO$. Since the pyrogen does not in this case contain peroxides, the amount of oxygen gas which is freed is considerably reduced but even so, since it is not, in fact, altogether eliminated, the aforementioned problem of the swelling and deformation of the pyrogen following combustion remains.

SUMMARY OF THE INVENTION

In order to solve the problems outlined above, the inventors conducted a number of tests and studies as a result of which they perfected the pyrogen of the invention which is characterized by the fact that it is an oxide which has the potential to remain stable at high temperatures while at the same time giving up oxygen to the Si.

The pyrogen of the invention is formed by the compression of a metal powder and a metal oxide powder where said metal powder consists of powdered ferrosilicon and said oxide powder consists of a mixture of powdered ferric oxide ($Fe_2O_3$) and another powdered iron oxide of a lower order ($Fe_2O_3$-x where x=0.2 to 1.0). In this pyrogen said mixture of ferric oxide powder with a powdered iron oxide of a lower order performs the role of oxygen donor, thereby dispensing with the need for a peroxide to act as said donor. During combustion, therefore, the pyrogen does not produce free oxygen, with the result that the pyrogen itself does not swell and the combustion process is able to proceed at a smooth and easy pace without the generation of sparks or flames. The invention can thus be used either to cook or simply to heat up various foodstuffs, thereby making it a perfect portable heat source.

A self-combusting pyrogen which derives its heat from the exothermic oxidation of powdered metal offers the advantage of generating a higher level of heat during the course of a reaction than is produced by the more conventional lime based pyrogens which make use of the heat which is generated by the addition of water of quick lime. For this reason, it has proved possible to generate sufficient heat with the pyrogen of the invention to produce boiling, a function which has not hitherto been achievable using lime based pyrogens. This in turn raised the possibility of creating some sort of canister in which to incorporate such a boiling function based on the utilization of this type of self-combusting pyrogen.

However, if this type of canister is to be produced on a commercial basis then the complexity of the thermal insulation structure required would be likely to necessitate the use of a fairly large canister while the sort of ignition device required to generate the high ignition temperature needed by the heating agent would almost certainly force up the container's production costs and taken together these drawbacks would impair its practical value as a disposable canister.

In order to solve the problems outlined above, the inventors conducted a number of tests and studies as a result of which they successfully developed the canister of the invention which is characterized by the compactness and high heat generation of the pyrogen and its accompanying thermal insulator and the rational structure of the related ignition device.

The object of the invention is to provide a cheap, safe canister which calls simply for the adjustment of the amount of pyrogen to enable it to be used to heat a variety of different foodstuffs ranging from those which are sometimes referred to as "fever foods" (hereafter referred to simply as "FF") and which require boiling or proper cooking such as grains like rice, cereals and beans or noodles such as udon, soba or instant ramen through to those which are sometimes referred to as "fever drinks" (hereafter referred to simply as "FD") and which only require warming up at a single predetermined temperature such as sake, coffee, tea and other similar drinks and prepared foods such as western type soups, miso soup and rice porridge.

In order to achieve this object, the canister of the invention has been designed such that the lower part of the canister incorporates a combustion chamber which in turn houses a pyrogen which comes into direct contact with the top of said combustion chamber and which is formed by the compression of ferrosilicon powder and a suitable mixture of ferric oxide powder and a powdered iron oxide of a lower order. The pyrogen itself is in turn supported by a special ceramic thermal insulator with a hole through the middle. The hole in the middle of the thermal insulator is packed with an ignition device which comprises two distinct layers of material, the upper layer consisting of an instant high temperature generating ignition material and the lower layer consisting of an ignition agent, along with a match head chemical which protrudes from the bottom of said ignition device out through a hole in the base cover of the canister.

The bottom of the canister itself is fitted with a cap which is designed such that it can easily be removed or replaced as necessary. The use of a solid pyrogen in combination with a thermal insulator made of a special highly heat resistant ceramic have together facilitated the creation of a more compact, lighter weight canister and this has in turn enabled a reduction of approximately 60% in the cubic capacity of the combustion chamber compared with that of a more conventional canister. As a result it is now possible to heat a given volume of material to a given temperature using an aluminum canister which is approximately 25% lighter in weight than the sort of conventional canister which would have been necessary to heat an identical volume of material to an identical temperature.

Moreover, whether it is used for FF or for FD purposes, the canister of the invention accepts part of the food contents into the space between the outer wall of the combustion chamber, and the inner wall of the main body of the canister itself, at least for the upper part of the combustion chamber, and this serves to increase the overall adiabatic effect in this part of the canister. Particularly in cases where the canister is structured such that the pyrogen is supported by projections on the upper surface of the thermal insulator, an air-filled layer is created in the space between the pyrogen and the insulator and this further enhances the adiabatic effect while at the same time increasing the safety of the canister's design.

The pyrogen used in the canister of the invention has a high combustion temperature (normally about 1,400° C.) and is, therefore, fully capable of supporting the sorts of temperatures required for the boiling or warming of foodstuffs and it has been possible, as a result, to achieve very substantial reductions by comparison with conventional canisters in the length of time required from the point of ignition through to the point at which the food or drink in the canister is ready for consumption. Furthermore, since the aforementioned pyrogen does not change into a powdered form following combustion and since it also exhibits only minimal cubical expansion, disposal after use is easy. The thermal insulator referred to above is itself a specially manufactured compact, light weight ceramic with outstanding heat resisting characteristics. This enables substantial reductions in the level of external heat emission from the canister while at the same time facilitating the achievement of more thermally efficient boiling and heating operations. In the case of canisters used for the heating of FD, there is a space of constant size between the wall of the combustion chamber and the inner wall of the canister and this creates an overheat protection effect. Also, in the case of canisters used for the heating of FF, which are constructed in such a way that the lower part of the thermal insulation comes directly into contact with the inner wall of the canister, a similar overheat protection effect is nevertheless afforded by the fact that the inner wall of the canister in the vicinity of the upper half of said thermal insulation from which a significant amount of heat is emitted, is normally in contact with some sort of liquid or steam. There is, moreover, a layer of air sandwiched between the bottom cap and the base cover of the canister which serves to eliminate the risk of overheating or burning of articles close to the canister as a result of an abnormal temperature rise in the body of the canister itself, even when using a pyrogen with an extremely high combustion temperature.

The ignition device consists of a combination of a low temperature ignition agent and an instant high temperature generating ignition material. It is thus possible to ignite the pyrogen quickly and easily using a match head chemical while at the same time keeping to a minimum the amount of canister space required to house the ignition device itself. The canister is also fitted with its own water pack in cases where it is to be used for the purpose of boiling FF type foods such as rice. Moreover, since the pack itself is made of a quick melting material, even if the user forgets to empty the contents of the water pack over the rice but still ignites the canister, once the water starts to boil the high temperature inside the water pack will quickly melt the pack material, thereby releasing the water and preventing the canister from boiling dry.

Since the component parts such as the pyrogen, the thermal insulation material and the ignition device, which make up the interior of the combustion chamber, have been made more compact than those used in more conventional canisters, it is now possible to use a smaller canister than would previously have been required to heat up any given amount of food or drink. Since the component parts themselves are also cheap, the production cost per canister is low and this makes the final product well suited to use as a self-heating, throw-away canister.

The use of a powerful fireproof adhesive to cement the connections between the canister parts and the pyrogen and thermal insulation materials, for example, also helps keep the cost of production down while at the same time increasing the design safety of the finished product by making it more difficult to disassemble.

DETAILED DESCRIPTION OF THE PREFERRED EMBODIMENTS

Figure 1:
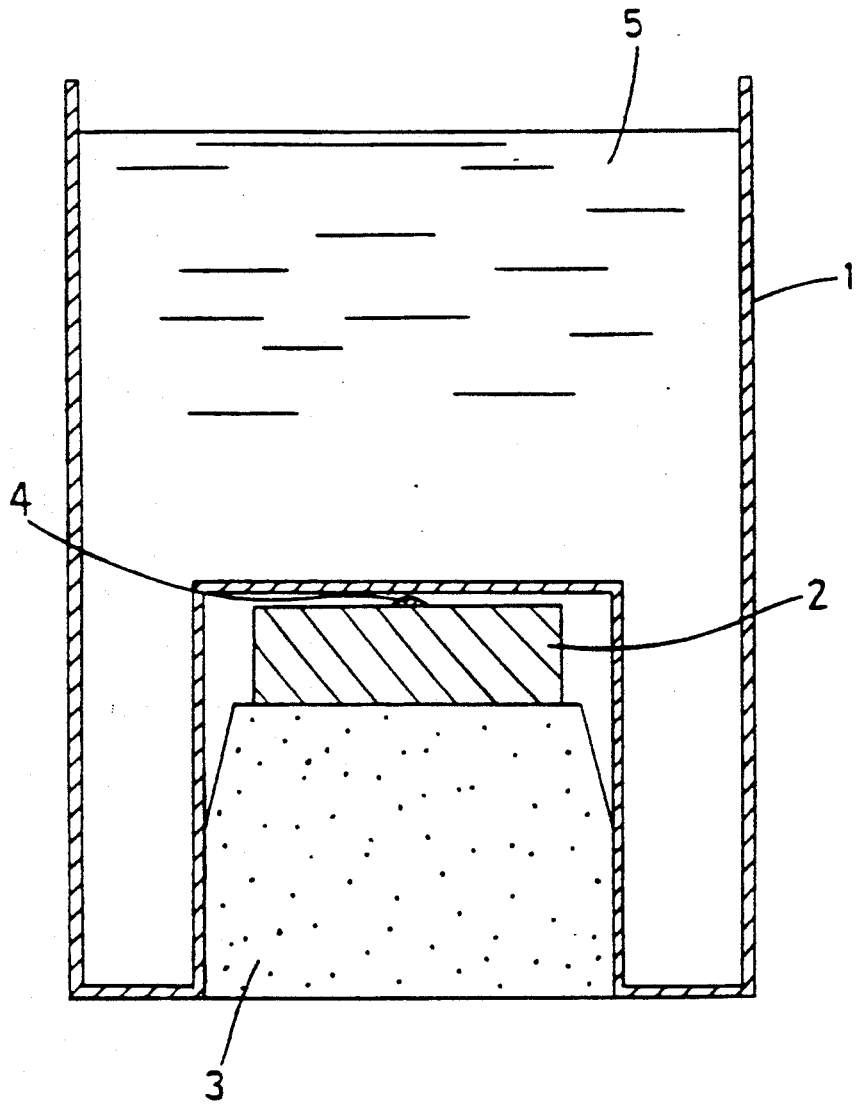
FIG. 1 is a longitudinal sectional view illustrating the basic form of a canister containing a pyrogen.

Basically any pyrogen made by compressing ferrosilicon powder and a suitable mixture of ferric oxide powder ($Fe_2O_3$) and a powdered lower order oxide of iron ($Fe_2O_{3-x}$ where $x=0.2$ to $1.0$) would constitute a valid example of the preferred embodiment. However, if a really excellent level of performance is to be obtained, then the metal constituents must each conform to their respective specifications as detailed below.

First, the amount of ferrosilicon powder added to the mixture should ideally be between 20 and 35 parts by weight. The reason for this is that anything less than 20 parts increases the tendency of the mixture to burn erratically, thereby impairing the smoothness of the combustion process. The addition of more than 35 parts of ferrosilicon, on the other hand, tends to reduce the amount of heat generated per unit of weight. The ideal average diametric size of the particles of ferrosilicon powder is 20 microns. The reason for this is that an average particle size of more than 20 microns tends to make the final mixture more difficult to ignite, thereby impairing the overall smoothness of the combustion process. The Si content of the ferrosilicon itself should be at least 75%.

The amount of ferric oxide added to the mixture should ideally be between 10 and 50 parts by weight. The reason for this is that the addition of less than 10 parts by weight may result in an excessive reduction in the strength of the pyrogen after compression while the addition of more than 50 parts may result in an excessive reduction in the effect obtained through the addition of iron oxides of a lower order ($Fe_2O_{3-x}$). The ideal average diametric particle size of the ferric oxide powder is 10 microns or less. Impurities in the ferric oxide such as S, Cl and $SO_3$ should also ideally be kept to a minimum.

The lower order iron oxide $Fe_2O_{3-x}$ powder referred to above can easily be obtained by the partial reduction of ferric oxide ($Fe_2O_3$). It is also possible to use substances obtained through the neutralization oxidation of bivalent Fe, for example, or else a fine particulate of a naturally occurring low order oxide iron ore. Magnetite, which is a triiron tetroxide ($Fe_3O_4$) in which the x value of $Fe_2O_{3-x}$ is approximately 0.33, is particularly suitable for use as the principal lower order iron oxide since it is both cheap and easy to obtain. Triiron tetroxide also has a number of other outstanding features in that it is, for example, even more stable than ferric oxide at high temperatures, it does not easily give up oxygen even in response to the heat of combustion of Si, it tends to absorb free oxygen released by the ferric oxide and it is thus conducive to the suppression of problems such as cracking or expansion of the pyrogen following combustion. Moreover, by using triiron tetroxide in combination with an $Fe_2O_3$-x in which the x value is between 0.2 and 1.0, the combustion process is rendered more gentle than that produced by a pyrogen which uses only ferric oxide to contribute oxygen to the Si. It is possible, therefore, in this sort of case to adjust the speed of the combustion process itself. The amount of said lower order iron oxide powder $Fe_2O_3$-x added to the mixture should ideally be between 20 and 60 parts by weight. The reason for this is that the addition of less than 20 parts by weight would tend to lead to a reduction in the effect obtained by adding a lower order iron oxide ($Fe_2O_3$-x) to the mixture while the addition of more than 60 parts by weight, on the other hand, would tend to reduce the amount of heat generated per unit of weight while at the same time leading to a reduction in the strength of the mixture after forming. The ideal average diametric size of the particles of the lower order iron oxide $Fe_2O_3$-x is 10 microns or less. The powdered lower order iron oxide $Fe_2O_3$-x should preferably contain only minimal amounts of the types of impurities which are likely to become gaseous at high temperatures. Although it would be possible to facilitate the adjustment of the speed of combustion of the Si and $Fe_2O_3$ by incorporating into the pyrogen substances such as alumina, silica or powdered rock which would not act as oxygen donors, the problem is that even the addition of only very small amounts of such substances tends to result in the impairment of smooth combustion and may even result in premature termination of the combustion process. The addition of such substances should, therefore, be avoided wherever possible.

The aforementioned pyrogen can be compressed into a variety of shapes such as pillar or plate shapes as required. Powdered ferrosilicon combined with a suitable mixture of powdered ferric oxide and a lower order iron oxide powder could also, for example, be compressed without further preparation in a metal mold to between 200 and 500 kg/cm². A similar mixture could, on the other hand, be compressed to just 100 to 300 kg/cm² after the addition of between 1.0% and 3.% of some sort of non-combustible ceramic based binder.

Preferred embodiments No.1 to No.12 of the pyrogen will now be described in some detail.

PREFERRED EMBODIMENT NO.1

30 parts by weight of a ferrosilicon (Fe: 25%, Si: 75%) particulate with an average diametric particle size of 8 microns, 30 parts by weight of an $Fe_2O_3$ particulate with an average diametric particle size of 2 microns and 40 parts by weight of a magnetite (mainly $Fe_3O_4$, x=0.33) particulate were mixed together to form 15 g of powder which was then placed inside a metal mold with a diameter of 3 cm and compressed at 300 kg/cm² to form a pyrogen of 1.0 cm in thickness.

The pyrogen 2 was first placed on top of the thermal insulator 3 shown in FIG. 1. Approximately 0.2 g to 0.3 g of a mixture of iron, ferrosilicon, copper oxide and barium peroxide powders was then placed more or less in the center of said pyrogen 2 to act as an ignition agent 4. 180 ml of water 5 at a temperature of 20° C. was then poured into the aluminum canister 1 shown in FIG. 1 and then, after igniting the aforementioned ignition agent with a match, the pyrogen 2 was immediately inserted into the recession in the base of the aluminum canister 1 along with the thermal insulator 3. At the end of 5 minutes the temperature of the water was measured and was found to have risen to 51° C. It was also found that the pyrogen 2 continued to burn gently after it was inserted into the bottom of the aluminum canister 1 and that the diametric expansion of the pyrogen 2 after combustion was no more than 1.0 mm.

PREFERRED EMBODIMENTS NO. 2 AND NO. 3

Apart from altering the $Fe_2O_3$ and the $Fe_3O_4$ mixture ratios, the rise in the temperature of the water was in each case measured under exactly the same conditions as those described in connection with preferred embodiment No. 1 above. The results of the measurements taken are shown in Table 1 below. The combustion of the pyrogens proceeded smoothly in each case while the expansion of the pyrogens following combustion was again no more than 1.0 mm in either case.

TABLE 1

| Preferred embodiment No. | $Fe_2O_3$ (%) | $Fe_3O_4$ (%) | Water temperature after 5 minutes (°C.) | Absolute rise in temperature (°C.) |
|---|---|---|---|---|
| No. 2 | 10 | 60 | 49 | 29 |
| No. 3 | 50 | 20 | 53 | 33 |

PREFERRED EMBODIMENTS NO. 4 TO NO. 7

Apart from altering the $Fe_2O_3$ and the $Fe_3O_4$ mixture ratios, the rise in the temperature of the water was in each case measured under exactly the same conditions as those described in connection with preferred embodiment No. 1 above. The results of the measurements taken are shown in Table 2 below. The degree of diametric expansion measured in each of the pyrogens following combustion is also indicated in the table.

TABLE 2

| Preferred embodiment No. | $Fe_2O_3$ (%) | $Fe_3O_4$ (%) | Water temp. after 5 mins. (°C.) | Absolute rise in temp. (°C.) | Expansion (mm) |
|---|---|---|---|---|---|
| No. 4 | 70 | 0 | 54 | 34 | 3-5 |
| No. 5 | 65 | 5 | 54 | 34 | 2-3 |
| No. 6 | 5 | 65 | 44 | 24 | 1 max. |
| No. 7 | 0 | 70 | 44 | 24 | 1 max. |

Although the expansion of the pyrogens in each of the preferred embodiments No. 6 and No. 7 did not exceed 1.0 mm, a limited amount of cracking was found to have occurred in each of the pyrogens following combustion while some 3.0 g to 4.0 g of the pyrogens remained uncombusted in both cases.

PREFERRED EMBODIMENTS NO. 8 TO NO. 10

Apart from altering the amount of ferrosilicon (Fe: 25%, Si: 75%) added to the mixture, the rise in the temperature of the water was in each case measured under exactly the same conditions as those described in connection with preferred embodiment No. 1 above. The results of the measurements taken are shown in Table 3 below.

TABLE 3

| Preferred embodiment No. | Ferrosilicon (%) | Water temperature after 5 minutes (°C.) | Absolute rise in temperature (°C.) |
| --- | --- | --- | --- |
| No. 8 | 35 | 48 | 28 |
| No. 9 | 25 | 52 | 32 |
| No. 10 | 20 | 53 | 33 |

In the case of preferred embodiment No. 10, combustion proceeded smoothly although some 0.5 g of the pyrogen was left uncombusted. Following completion of the combustion process, the expansion of the pyrogens was found to measure no more than 1.0 mm in each case.

PREFERRED EMBODIMENTS NO. 11 AND NO. 12

Apart from altering the amount of ferrosilicon added to the mixture, the rise in the temperature of the water was in both cases measured under exactly the same conditions as those described in connection with preferred embodiment No. 1 above. The results of the measurements taken are shown in Table 4 below. Measurements taken on completion of the combustion process indicated that the pyrogens had in neither case expanded by more than 1.0 mm.

TABLE 4

| Preferred embodiment No. | Ferrosilicon (%) | Water temperature after 5 minutes (°C.) | Absolute rise in temperature (°C.) |
| --- | --- | --- | --- |
| No. 11 | 40 | 42 | 22 |
| No. 12 | 17 | 40 | 20 |

In the case of preferred embodiment No. 12, some 4.5 g of the pyrogen remained uncombusted.

PREFERRED EMBODIMENT NO. 13

Figure 2:
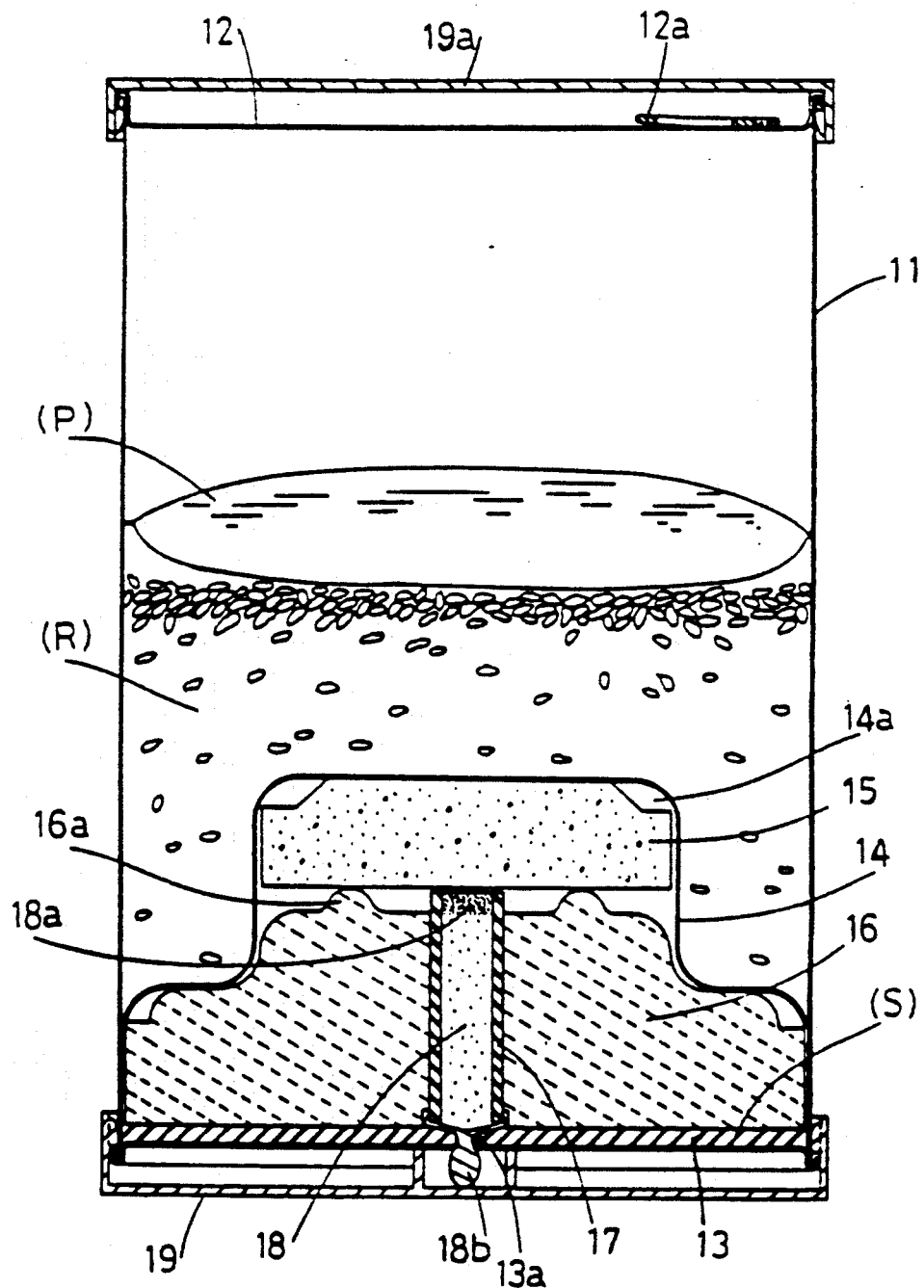
FIG. 2 is a longitudinal sectional view of the central part of a canister designed for use with FF.

There now follows a description of the preferred embodiment of a canister with a built-in pyrogen as referred to above. FIG. 2 shows an example of the sort of canister which is designed primarily for use in the heating of FF. 11 in the figure represents the main body of a steel or aluminum canister, 12 is a pull-top type lid fitted with a ring pull 12a and 13 is the base cover of the canister in the middle of which there is a hole 13a. The lid 12 of the canister and the base cover 13 are each secured to the main body of the canister by means of wrap around jointing. 14 is an inner container the bottom half of which is secured by means of an adhesive in such a way that its wall comes into direct contact with the inner wall of the main body of the canister 11. Said inner container forms the combustion chamber 14a. 15 is the pyrogen held in the upper part of said combustion chamber 14a and 16 is a special ceramic thermal insulator which supports said pyrogen. More or less in the center of said thermal insulator 16 there is a hole into which the ignition device is fitted. The ignition device itself comprises an ignition tube 17, which extends through the hole in the thermal insulator 16 almost up to the bottom of the pyrogen 15, an ignition agent 18 which is packed into the inside of the ignition tube, an instant high temperature generating ignition material 18a, which is laid on top of the ignition agent 18, thereby constituting the top layer of the ignition device at the point where it meets the under surface of the pyrogen 15, and a match head chemical 18b which is fitted in such a way that it projects from the bottom end of said ignition tube through the hole 13a in the base cover 13 of the canister. 19 is a plastic bottom cap, 19a is a plastic top cap and (S) is a thermal insulation sheet which may be laid between the thermal insulator and the base cover 13 as and when necessary.

There now follows a description of a typical way in which the FF type canister of preferred embodiment No. 13 above might be used. First of all 60 g of pyrogen in inserted into the combustion chamber 14a. 140 g of processed rice (quick boil rice) (R) is then placed in the upper chamber of the canister and a 110 ml pack of water (P) is placed on top of the rice. The lid 12 is then put on to seal the main canister 11. In order to cook the rice, first the top cap 19a must be taken off, then the pull-top lid 12 must be released by means of the ring-pull fitting. Next the water pack (P) must be taken out of the canister (if the processed rice is also enclosed in a pack then this must also, of course, be removed from the canister in the same way) and after opening the pack, all the water should then be poured over the rice. The top cap 19a must then be replaced on top of the canister.

The next step is to remove the bottom cap 19 and rub the chemical strip (not shown in the drawings), which is secured by an adhesive to the underside of the bottom cap or similar position, across the match head chemical 18b to strike a light. The flame which is generated in this way is immediately relayed by way of the ignition agent 18 and the instant high temperature generating ignition material 18a to the solid pyrogen 15 which begins self-combustion in response. The heat generated at this point has been measured at 1,400° C.

From the moment that the pyrogen 15 is ignited in the manner outlined above, it will then take approximately 10 minutes to produce perfectly cooked and completely scorch free rice. In the case of rice, however, in order to ensure that it is cooked to perfection, it is always advisable to leave it to steam for a further 5 minutes after the initial cooking has been completed. In addition, while the rice is cooking, the steam which is generated will be discharged from the canister by way of a gap in the top cap 19a while any hot water which might spurt out from the boiling liquid will be trapped by said top cap from where it will run down through a gap between the main body of the canister and a thermal insulation sheet (not shown in the drawings) which is wound around the canister.

PREFERRED EMBODIMENT NO. 14

Figure 3:
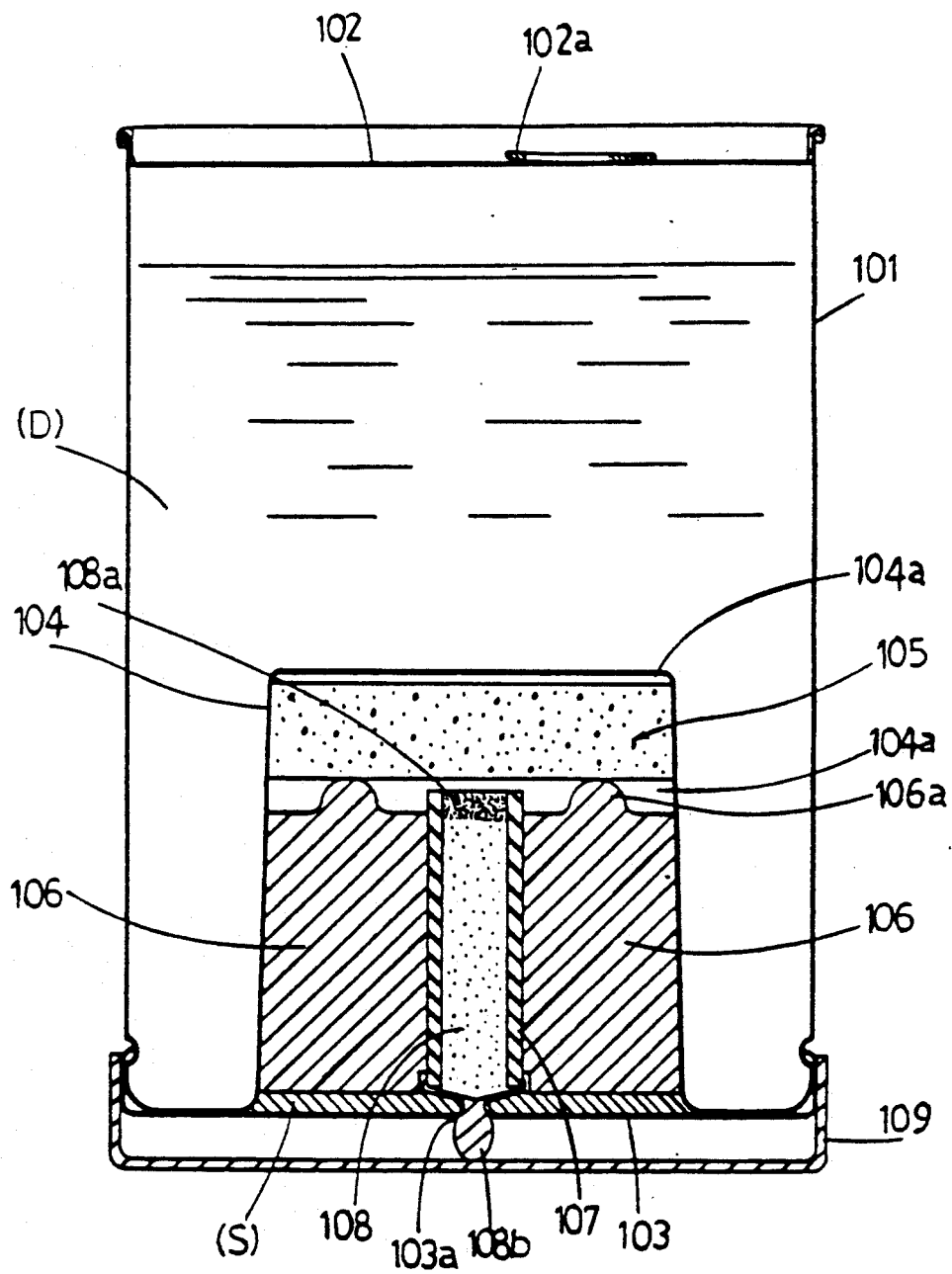
FIG. 3 is a longitudinal sectional view of the central part of a canister designed for use with FD.

FIG. 3 illustrates the preferred embodiment of an FD type canister. In the drawing 101 is the main body of a canister formed by the deep drawing of a sheet metal such as aluminum, for example, and 104 is an inner container formed by pressing the middle part of the base of the main body of the canister 101 inwards in such a way that the wall of said inner container 104 forms a combustion chamber 104a with a fixed distance between itself and the inner wall of the canister. 102 is the pull-top lid of the canister complete with ring-pull 102a and is secured to the main body of the canister 101 by means of wrap around jointing. 103 is the base cover of the canister with a hole 103a at its center. In just the same way as in preferred embodiment No. 13 described above, the aforementioned combustion chamber 104a contains a pyrogen 105 along with a thick cylindrical thermal insulator 106 made of a special ceramic material with an ignition device located more or less at its center. Said ignition device comprises an ignition tube 107, which extends up through the hole in the thermal insulator 106, an ignition agent 108 which is packed into the inside of the ignition tube, an instant high temperature generating ignition material 108a, which rests on top of the ignition agent 108 and constitutes the top layer of the ignition device, and a match head chemical 108b which is fitted in such a way that it projects from the bottom end of said ignition tube 107 through the hole 103a in the base cover 103 of the canister. The ring shaped protuberance 106a on the upper surface of the aforementioned thermal insulator 106 constitutes an inseparable part of the insulator 106 itself.

The aforementioned pyrogen 105 is formed by the compression into a solid flat shape of ferrosilicon powder and a suitable mixture of ferric oxide powder and a powdered iron oxide of a lower order. The special ceramic which is used for the aforementioned thermal insulator 106 consists either of a substance composed mainly of silicon and baked to give it a sponge-like form or else of a suitable mixture of pearlite and clay. Furthermore, both the ignition agent 108 and the instant high temperature generating ignition material 108a of the aforementioned ignition device are each compounds formed by the mixing of fine particulates of metals and metal oxides. Ideally, the constituents of the ignition agent 108 should be capable of being easily ignited by a match head chemical and also of burning fast. In the case of the top layer of instant high temperature generating ignition material 108a, on the other hand, the constituents should ideally be capable of supporting a combustion temperature in the region of 1,000° C. to 1,500° C. 109 is a plastic bottom cap and (S) is a thermal insulation sheet which can be laid between the thermal insulator and the base cover 103 as and when necessary.

There now follows a description of a typical way in which the FD type canister of preferred embodiment No. 14 above might be used. First of all 20 g of the pyrogen 105 is inserted into the combustion chamber 104a. 200 ml of coffee liquid (D) is then placed in the upper chamber of the canister 101 and the can sealed. When the time comes to heat up the coffee, first the bottom cap is removed and the chemical strip on the side of the cap used to ignite the match head chemical. The bottom cap is then replaced and within approximately one and a half minutes the coffee liquid inside the canister is heated up to a temperature of about 40° C. above the ambient temperature. The coffee is now ready to drink.

Having described the invention in detail and by reference to preferred embodiments thereof, it will be apparent that modifications and variations are possible without departing from the scope of the invention defined in the appended claims.

What is claimed is:

1. A pyrogen obtained by compression forming of a mixture comprising
   about 20 to 35 parts by weight of a ferrosilicon powder,
   about 10 to 50 parts by weight of ferric oxide ($Fe_2O_3$) powder, and a about 20 to 60 parts by weight of powdered lower order iron oxide of the formula $Fe_2O_3$-x where x=0.2 to 1.0, wherein the degree of diametric expansion following combustion of said pyrogen is no more than 1.0 mm.

2. The pyrogen according to claim 1 in which the average diametric size of said ferrosilicon powder is about 20 microns or less.

3. The pyrogen according to claim 1 in which the Si content of said ferrosilicon powder is 75% or more.

4. The pyrogen according to claim 1 in which the average diametric size of said ferric oxide powder is about 10 microns or less.

5. The pyrogen according to claim 1 in which the average diametric size of said lower order iron oxide powder is about 10 microns or less.

6. The pyrogen according to claim 1 in which said lower order iron oxide is a triiron tetroxide ($Fe_3O_4$) in which the x value of the $Fe_2O_3$-x is approximately 0.33.

7. The pyrogen according to claim 1 in which said lower order iron oxide is obtained by the partial reduction of said ferric oxide.

8. The pyrogen according to claim 1 in which said lower order iron oxide is obtained by the neutralization oxidation of bivalent Fe.

9. The pyrogen according to claim 1 in which said lower order iron oxide powder is obtained by the pulverization into a fine particulate of a naturally occurring low order oxide iron ore.

10. The pyrogen according to claim 1 consisting essentially of Fe, Si, and O alloys.

11. The pyrogen according to claim 1 having an ignition point temperature ranging from about 1,000° C. to about 1,500° C.

* * * * *